(12) United States Patent
Alibay et al.

(10) Patent No.: US 10,229,508 B2
(45) Date of Patent: Mar. 12, 2019

(54) DYNAMIC PARTICLE FILTER PARAMETERIZATION

(71) Applicant: STMicroelectronics SA, Montrouge (FR)

(72) Inventors: Manu Alibay, Vincennes (FR);
Stéphane Auberger,
Saint-Maur-des-Fosses (FR)

(73) Assignee: STMICROELECTRONICS SA,
Montrouge (FR)

( * ) Notice: Subject to any disclaimer, the term of this patent is extended or adjusted under 35 U.S.C. 154(b) by 0 days.

(21) Appl. No.: 15/382,164

(22) Filed: Dec. 16, 2016

(65) Prior Publication Data

US 2017/0178347 A1   Jun. 22, 2017

(30) Foreign Application Priority Data

Dec. 17, 2015  (FR) ...................................... 15 62585
Nov. 18, 2016  (EP) ...................................... 16199464

(51) Int. Cl.
*G06T 7/277*   (2017.01)

(52) U.S. Cl.
CPC .... *G06T 7/277* (2017.01); *G06T 2207/10004* (2013.01); *G06T 2207/10028* (2013.01); *G06T 2207/20076* (2013.01); *G06T 2207/30241* (2013.01); *G06T 2207/30244* (2013.01)

(58) Field of Classification Search
CPC ........... G06T 7/277; G06T 2207/10004; G06T 2207/10028; G06T 2207/20076; G06T 2207/30241; G06T 2207/30244
See application file for complete search history.

(56) References Cited

U.S. PATENT DOCUMENTS

| | | | |
|---|---|---|---|
| 9,430,847 B2 | 8/2016 | Ramalingam et al. | |
| 2001/0033692 A1 | 10/2001 | Borneo et al. | |
| 2005/0094852 A1 | 5/2005 | Kumar et al. | |
| 2005/0105627 A1 | 5/2005 | Sun et al. | |
| 2005/0182518 A1* | 8/2005 | Karlsson .............. | G05D 1/0246 700/253 |
| 2008/0137908 A1 | 6/2008 | Stein et al. | |
| 2011/0153206 A1 | 6/2011 | Kotaba et al. | |
| 2011/0169923 A1 | 7/2011 | Dellaert et al. | |

(Continued)

FOREIGN PATENT DOCUMENTS

FR      3 027 144 A1    4/2016

OTHER PUBLICATIONS

Eade et al. "Edge landmarks in monocular SLAM." Image and Vision Computing 27.5 (2009): 588-596.*

(Continued)

*Primary Examiner* — Katrina R Fujita
(74) *Attorney, Agent, or Firm* — Seed IP Law Group LLP (57) ABSTRACT

Method of estimating a position variation of a motion of an apparatus between a first instant and a second instant, said motion including a rotation of the apparatus and said position variation, said position variation including a position and a velocity, wherein estimating said position variation comprises performing a particles filtering for estimating said position and velocity from the probabilistic-weighted average of the particles, said particles filter using a known estimation of said rotation and being parameterized for taking into account a quality of said rotation estimation.

28 Claims, 5 Drawing Sheets

(56) References Cited

U.S. PATENT DOCUMENTS

| | | | |
|---|---|---|---|
| 2011/0285811 A1* | 11/2011 | Langlotz | H04N 5/23238 348/37 |
| 2011/0299735 A1 | 12/2011 | Anisimovich et al. | |
| 2012/0070037 A1* | 3/2012 | Polle | G01C 21/005 382/103 |
| 2012/0121161 A1* | 5/2012 | Eade | G09B 29/007 382/153 |
| 2012/0281922 A1 | 11/2012 | Yamada et al. | |
| 2013/0080045 A1 | 3/2013 | Ma et al. | |
| 2014/0212027 A1 | 7/2014 | Hallquist et al. | |
| 2014/0355832 A1 | 12/2014 | Thouy et al. | |
| 2015/0099025 A1 | 4/2015 | Spalt | |
| 2015/0142248 A1* | 5/2015 | Han | G01C 21/3602 701/23 |
| 2015/0304634 A1* | 10/2015 | Karvounis | H04N 13/0239 348/46 |
| 2015/0312719 A1 | 10/2015 | Cho et al. | |
| 2017/0177980 A1 | 6/2017 | Alibay et al. | |
| 2017/0178355 A1 | 6/2017 | Alibay et al. | |
| 2017/0180644 A1 | 6/2017 | Alibay et al. | |

OTHER PUBLICATIONS

Hilsenbeck et al. "Graph-based data fusion of pedometer and WiFi measurements for mobile indoor positioning." Proceedings of the 2014 ACM international joint conference on pervasive and ubiquitous computing. ACM, 2014.*

Alibay et al. "Hybrid visual and inertial RANSAC for real-time motion estimation." Image Processing (ICIP), 2014 IEEE International Conference on. IEEE, 2014.*

Leizea, Ibai, Hugo Álvarez, and Diego Borro. "Real time non-rigid 3D surface tracking using particle filter." Computer Vision and Image Understanding 133 (Dec. 17, 2014): 51-65. (Year: 2014).*

Ababsa et al., "Inertial and Vision Head Tracker Sensor Fusion Using a Particle Filter for Augmented Reality Systems," 2004 International Symposium on Circuits and Systems, Vancouver, BC, Canada, May 23-26, 2004, 4 pages.

Armesto et al., "On multi-rate fusion for non-linear sampled-data systems: Application to a 6D tracking system," *Robotics and Autonomous Systems* 56:706-715, 2008.

Bleser et al., Using Optical Flow for Filling the Gaps in Visual-Inertial Tracking, 18th European Signal Processing Conference, Aalborg, Denmark, Aug. 23-27, 2010, 5 pages.

Huster et al., "Relative Position Estimation for Intervention-Capable AUVS by Fusing Vision and Inertial Measurements," 12th International Symposium on Unmanned Untethered Submersible Technology, Durham, New Hampshire, Aug. 2001, 11 pages.

Li et al., "A Reliable and Accurate Indoor Localization Method Using Phone Inertial Sensors," 14th ACM International Conference on Ubiquitous Computing, Pittsburgh, Pennsylvania, Sep. 5-8, 2012, 10 pages.

Trawny et al., "Vision-Aided Inertial Navigation for Pin-Point Landing using Observations of Mapped Landmarks," *Journal of Field Robotics* 24(5):357-378, 2007.

Vernaza et al., "Rao-Blackwellized Particle Filtering for 6-DOF Estimation of Attitude and Position via GPS and Inertial Sensors," 2006 IEEE International Conference on Robotics and Automation, Orlando, Florida, May 15-19, 2006, 8 pages.

Klingbeil et al., "A Wireless Sensor Network for Real-time Indoor Localization and Motion Monitoring," 2008 International Conference on Information Processing in Sensor Networks, St. Louis, MO, Apr. 22-24, 2008, 12 pages.

Kneip et al., "Robust Real-Time Visual Odometry with a Single Camera and an IMU," The 22$^{nd}$ British Machine Vision Conference, Dundee, Scotland, Aug. 29-Sep. 2, 2011, 11 pages.

Liang et al., "Reduced-Complexity Data Acquisition System for Image-Based Localization in Indoor Environments," 2013 International Conference on Indoor Positioning and Indoor Navigation, Montbéliard-Belfort, France, Oct. 28-31, 2013, 9 pages.

Merzban et al., "Toward Multi-Stage Decoupled Visual SLAM System," 2013 IEEE International Symposium on Robotic and Sensors Environments (ROSE), Washington, DC, Oct. 21-23, 2013, 6 pages.

Tanaka et al., "Incremental RANSAC for Online Relocation in Large Dynamic Environments," 2006 IEEE International Conference on Robotics and Automation, Orlando, FL, May 15-19, 2006, 8 pages.

Voigt et al., "Robust Embedded Egomotion Estimation," 2011 IEEE/RSJ International Conference on Intelligent Robots and Systems, San Francisco, CA, Sep. 25-30, 2011, 6 pages.

Kurz et al., "Inertial sensor-aligned visual feature descriptors," 2011 IEEE Conference on Computer Vision and Pattern Recognition (CVPR), Colorado Springs, CO, Jun. 20-25, 2011, 6 pages.

Levi, "Adding rotation invariance to the BRIEF descriptor," *Gil's CV blog*, Jan. 2, 2015, retrieved from https://gilscvblog.com/2015/01/02/adding-rotation-invariance-to-the-brief-descriptor/ on Apr. 25, 2017, 20 pages.

Moulon et al., "Adaptive Structure from Motion with a Contrario Model Estimation," in *Lecture Notes in Computer Science 7727—Asian Conference on Computer Vision 2012 Part IV*, Lee et al. (eds.), Springer-Verlag Berlin Heidelberg, 2013, pp. 257-270.

Lim et al., "Real-Time 6-DOF Monocular Visual SLAM in a Large-Scale Environment," 2014 IEEE International Conference on Robotics & Automation (ICRA), Hong Kong, China, May 31-Jun. 7, 2014, 8 pages.

Hafez et al., "Particle-filter-based Pose Estimation from Controlled Motion with Application to Visual Servoing," *International Journal of Advanced Robotics Systems* 11(10):177, 2014. (11 pages).

Oka et al., "Head Pose Estimation System Based on Particle Filtering with Adaptive Diffusion Control," *MVA—IAPR Conference on Machine VIsion Applications*, Tsukuba Science City, Japan, May 16-18, 2005, pp. 586-589.

Comaniciu, "Density Estimation-based Information Fusion for Multiple Motion Computation," *IEEE Proceedings of the Workshop on Motion and Video Computing (Motion '02)*, Orlando, Florida, USA, Dec. 9, 2002, pp. 241-246.

Alahi et al., "FREAK: Fast Retina Keypoint," *2012 IEEE Conference on Computer Vision and Pattern Recognition (CVPR)*, Providence, Rhode Island, Jun. 16-21, 2012, pp. 510-517.

Alibay et al., "Hybrid Visual and Inertial Ransac for Real-Time Motion Estimation," *2014 IEEE International Conference on Image Processing (ICIP)*, Paris, France, Oct. 27-30, 2014, pp. 179-183.

Alibay, "Extended sensor fusion for embedded video applications," Thesis to obtain a Doctorate in Computer Science and Robotics from the Paris Institute of Technology, Dec. 18, 2015, 138 pages.

Calonder et al., "BRIEF: Binary Robust Independent Elementary Features," *11$^{th}$ European Conference on Computer Vision*, Hersonissos, Greece, Sep. 5-11, 2010, 14 pages.

Calonder et al., "BRIEF: Computing a Local Binary Descriptor Very Fast," *IEEE Transactions on Pattern Analysis and Machine Intelligence* 34(7):1281-1298, Jul. 2012.

Civera et al., "1-Point RANSAC for EKF Filtering. Application to Real-Time Structure from Motion and Visual Odometry," *2009 IEEE/RSJ International Conference on Intelligent Robots and Systems (IROS 2009)*, St.Louis, Missouri, Oct. 10-15, 2009, 32 pages.

Davison, "MonoSLAM: Real-Time Single Camera SLAM," *IEEE Transactions on Pattern Analysis and Machine Intelligence* 29(6):1052-1067, Jun. 2007.

Davison, "Real-Time Simultaneous Localisation and Mapping with a Single Camera," *Proceedings of the Ninth IEEE International Conference on Computer Vision (ICCV'03)*, Nice, France, Oct. 13-16, 2003, 8 pages.

Dubrofsky, "Homography Estimation," A master's essay submitted in partial fulfillment of the requirements for the degree of Master of Science in the Faculty of Graduate Studies (Computer Science) from The University of British Columbia (Vancouver), 32 pages, Mar. 2009.

Durrie et al., "Vision-Aided Inertial Navigation on an Uncertain Map Using Particle Filter," *2009 IEEE International Conference on Robotics and Automation*, Kobe, Japan, May 12-17, 2009, pp. 4189-4194.

(56) References Cited

OTHER PUBLICATIONS

Fischler et al., "Random Sample Consensus: A Paradigm for Model Fitting with Applications to Image Analysis and Automated Cartography," *Communications of the ACM* 24(6):381-395, Jun. 1981.
Hartley et al., *Multiple View Geometry in Computer Vision*, Cambridge, UK, Cambridge University Press, 2003, 673 pages.
Hartley, "In Defence of the 8-point Algorithm" $5^{th}$ *IEEE International Conference on Computer Vision*, Cambridge, Massachusetts, Jun. 20-23, 1995, pp. 1064-1070.
Holmes et al., "An $O(N^2)$ Square Root Unscented Kalman Filter for Visual Simultaneous Localization and Mapping," *IEEE Transactions on Pattern Analysis and Machine Intelligence* 31(7):1251-1263, Jul. 2009.
Horn et al., "Determining Optical Flow," *Artificial Intelligence* 17(1-3):185-203, Aug. 1981.
Hwangbo et al., "Inertial-Aided KLT Feature Tracking for a Moving Camera," *2009 IEEE/RSJ International Conference on Intelligent Robots and Systems*, St. Louis, Missouri, Oct. 11-15, 2009, pp. 1909-1916.
Jia et al., "Probabilistic 3-D Motion Estimation for Rolling Shutter Video Rectification from Visual and Inertial Measurements," $14^{th}$ *IEEE International Workshop on Multimedia Signal Processing (MMSP)*, Banff, Canada, Sep. 17-19, 2012, pp. 203-208.
Julier et al., "A New Extension of the Kalman Filter to Nonlinear Systems," *Proceedings of SPIE 3068, Signal Processing, Sensor Fusion, and Target Recognition VI*, Orlando, Florida, Apr. 21, 1997, 12 pages.
Kalman, "A New Approach to Linear Filtering and Prediction Problems," *Journal of Basic Engineering* 82(1):35-45, Mar. 1960.
Karpenko et al., "Digital Video Stabilization and Rolling Shutter Correction using Gyroscopes," *Stanford Tech Report CTSR Mar. 2011*, 7 pages.
Klein et al., "Parallel Tracking and Mapping for Small AR Workspaces," $6^{th}$ *IEEE and ACM International Symposium on Mixed and Augmented Reality*, Nara, Japan, Nov. 13-16, 2007, 10 pages.
Kurz et al., "Gravity-Aware Handheld Augmented Reality," *IEEE International Symposium on Mixed and Augmented Reality 2011*, Basel, Switzerland, Oct. 26-29, 2011, pp. 111-120.
Kurz et al., "Handheld Augmented Reality involving gravity measurements," *Computers & Graphics* 36:866-883, 2012.
Lepetit et al., "EPnP: An Accurate O(n) Solution to the PnP Problem," *International Journal of Computer Vision* 81(2):155-166, 2009.
Leutenegger et al., "BRISK: Binary Robust Invariant Scalable Keypoints," *2011 IEEE International Conference on Computer Vision*, Barcelona, Spain, Nov. 6-13, 2011, 8 pages.
Liu et al., "Sequential Monte Carlo Methods for Dynamic Systems," *Journal of the American Statistical Association* 93(443):1032-1044, Sep. 1998.
Lobo et al., "Vision and Inertial Sensor Cooperation Using Gravity as a Vertical Reference," *IEEE Transactions on Pattern Analysis and Machine Intelligence* 25(12):1597-1608, Dec. 2003.
Lowe, "Distinctive Image Feature from Scale-Invariant Keypoints," *International Journal of Computer Vision* 60(2):91-110, Nov. 2004.
Montemerlo et al., "FastSLAM: A Factored Solution to the Simultaneous Localization and Mapping Problem," *Proceedings of the $18^{th}$ National Conference on Artificial Intelligence*, Edmonton, Canada, Jul. 28-Aug. 1, 2002, 6 pages.
Mourikis et al., "A Multi-State Constraint Kalamn Filter for Vision-aided Inertial Navigation," *2007 IEEE International Conference on Robotics and Automation*, Rome, Italy, Apr. 10-14, 2007, 8 pages.
Murray et al., *A Mathematical Introduction to Robotic Manipulation*, CRC Press, 1994, 474 pages.
Nistér, "An Efficient Solution to the Five-Point Relative Pose Problem," *IEEE Transactions on Pattern Analysis and Machine Intelligence* 26(6):756-770, Apr. 2004.
Nistér, "Preemptive RANSAC for Live Structure and Motion Estimation," *Proceedings of the $9^{th}$ IEEE International Conference on Computer Vision*, 2003, pp. 199-206.
Rosten et al., "Faster and Better: A Machine Learning Approach to Corner Detection," *IEEE Transactions on Pattern Analysis and Machine Intelligence* 32(1):105-199, Jan. 2010.
Rosten et al., "Machine learning for high-speed corner detection," $9^{th}$ *European Conference on Computer Vision*, Graz, Austria, May 7-13, 2006, 14 pages.
Rublee et al., "ORB: an efficient alternative to SIFT or SURF," *2011 IEEE International Conference on Computer Vision*, Barcelona, Spain, Nov. 6-13, 2011, 8 pages.
Scaramuzza et al., "Tutorial: Visual Odometry Part I: The First 30 Years and Fundamentals," *IEEE Robotics & Automation Magazine* 18(4):80-92, Dec. 2011.
Shoemake, "Animating Rotation with Quaternion Curves," *ACM SIGGRAPH Computer Graphics* 19(3):245-254, Jul. 1985.
Strasdat et al., "Real-time Monocular SLAM: Why Filter?," *2010 IEEE International Conference on Robotics and Automation*, Anchorage, Alaska, May 3-8, 2010, pp. 2657-2644.
Triggs et al., "Bundle Adjustment—A Modern Synthesis," *Vision Algorithms: Theory and Practice* 1883:298-372, 2000.
You et al., "Fusion of Vision and Gyro Tracking for Robust Augmented Reality Registration," *Proceedings of the IEEE Virtual Reality 2001 Conference*, Yokohama, Japan, Mar. 13-17, 2001, 8 pages.
You et al., "Hybrid Inertial and Vision Tracking for Augmented Reality Registration," *Proceedings of the IEEE Virtual Reality 1999 Conference*, Houston, Texas, Mar. 13-17, 1999, 8 pages.
You et al., "Orientation Tracking for Outdoor Augmented Reality Registration," *IEEE Computer Graphics and Applications* 19(6):36-42, Nov./Dec. 1999.
Zhang, "A Flexible New Technique for Camera Calibration," *IEEE Transactions on Pattern Analysis and Machine Intelligence* 22(11):1330-1334, Nov. 2000.
U.S. Appl. No. 15/381,928, filed Dec. 16, 2016, Method, Device and Apparatus to Estimate an Ego-Motion of a Video Apparatus in a Slam Type Algorith.
U.S. Appl. No. 15/382,013, filed Dec. 16, 2016, Threshold Determination in a Ransac Algorithm.
U.S. Appl. No. 15/381,919, filed Dec. 16, 2016, Method and Device for Generating Binary Descriptors in Video Frames.

\* cited by examiner

Frame coordinates

World coordinates

DYNAMIC PARTICLE FILTER PARAMETERIZATION

BACKGROUND

Technical Field

Implementations and embodiments of the disclosure relate to particle filtering, especially used in the determination of movement of an image sensor or apparatus (e.g., a video camera) between successive video images (frames) captured by said apparatus, such as one incorporated in a platform, such as a digital tablet or a mobile cellular telephone for example, in particular a dynamic parameterization of such particle filter used for example in the estimation of ego-motion of said apparatus (i.e., the 3D motion of said apparatus in an environment (and accordingly the ego-motion of the platform incorporating said apparatus)), for example in a SLAM type algorithm.

Description of the Related Art

Particle filtering is widely used in many domains of computer vision, from tracking to odometry. Also known as sequential Monte-Carlo estimation, it is a density estimator that utilizes a sampling strategy to represent the posterior density of the state probability [see for example Lui, J. S. & Chen, R., 1998. Sequential Monte Carlo Methods for Dynamic Systems. *Journal of the American Statistical Association,* 93(443), pp. 1032-1044, incorporated by reference in the present patent application].

A conventional particle filter is very accurate but costs a lot of computational resources.

BRIEF SUMMARY

According to an embodiment of the disclosure it is proposed to use less particles and thus reducing the cost of computational resources.

According to an aspect of the disclosure a method is proposed for estimating a position variation of a motion of an apparatus between a first instant and a second instant, said motion including a rotation of the apparatus and said position variation, said position variation including a position and a velocity.

According to this aspect, estimating said position variation comprises performing a particles filtering for estimating said position and velocity from the probabilistic-weighted average of the particles, said particles filter using a known estimation of said rotation and being parameterized for taking into account a quality of said rotation estimation.

Said parameterization is advantageously used in the velocity estimation.

According to an embodiment said apparatus (for example an image sensor or a camera, for example incorporated in a platform such as a smartphone or a tablet) is intended to capture a sequence of images, a first image (or frame) (for example the previous image) being captured at said first instant, a second image (for example the current image) being captured at said second instant; said motion is an ego-motion of the apparatus between capturing the first image and the second image including a 3D rotation of the apparatus and a position variation of the apparatus in the 3D space (said ego-motion is for example estimated in a Simultaneous Localization And Mapping SLAM type algorithm which comprises estimating the ego-motion of the apparatus (and accordingly the platform) and mapping its surrounding scene at the same time) and each particle is a virtual apparatus (virtual camera for example) and the particle filter is a visual measurement based particle filter.

It is also particularly interesting to use an improved SLAM type algorithm which, for estimating the ego-motion, first solves orientation, by using advantageously inertial sensors as assisting tools, and then estimates position with orientation known.

Said 3D rotation is preferably estimated by performing a RANSAC type algorithm providing an inliers rate, and said parameterization of the particle filter taking into account a quality of said rotation estimation includes advantageously said inliers rate.

According to an embodiment, said parameterization of the particle filter comprises the calculation of a first parameter being a relationship between said inliers rate, the reprojection error of the best particle and a targeted reprojection error.

Advantageously, estimating said velocity further comprises guiding the particle spreading with a pedestrian step detection technique using accelerometers data.

More precisely, according to an embodiment, the velocity estimation takes into account said first parameter and a random 3D vector generated according to a Gaussian distribution involving an expected velocity for the second (current image), and said expected velocity for the second image is calculated by taking into account a current estimated rotation matrix (i.e., the estimated rotation matrix between the first (previous) and the second (current) images), a velocity of step and the frame rate of the apparatus.

According to another aspect of the disclosure, a device is proposed, comprising processing means (for example realized by a microprocessor executing software) configured to estimate a position variation of a motion of an apparatus between a first instant and a second instant, said motion including a rotation of the apparatus and said position variation, said position variation including a position and a velocity, wherein said processing means comprises particles filter means configured to perform a particles filtering for estimating said position and velocity from the probabilistic-weighted average of the particles, said particles filter using a known estimation of said rotation and being parameterized for taking into account a quality of said rotation estimation.

According to an embodiment, said particles filter means are configured to use said parameterization in the velocity estimation.

According to an embodiment, said apparatus is intended to capture a sequence of images, a first image being captured at said first instant, a second image being captured at said second instant, said motion is an ego-motion of the apparatus between the first image and the second image including a 3D rotation of the apparatus and a position variation of the apparatus in the 3D space, and each particle is a virtual apparatus.

According to an embodiment, the device further comprises a first processing module configured to estimate said 3D rotation by performing a RANSAC type algorithm providing an inliers rate, and said parameterization of the particle filter takes into account a quality of said rotation estimation includes said inliers rate.

According to an embodiment, said parameterization of the particle filter comprises a first parameter being a relationship between said inliers rate, the reprojection error of the best particle, and targeted reprojection error.

According to an embodiment, said processing means comprises a second processing module configured to estimate said velocity and comprising a guiding module configured to guide the particle spreading with a pedestrian step detection technique using accelerometers data.

According to an embodiment, said second processing module is configured to take into account said first parameter and a random 3D vector generated according to a Gaussian distribution involving an expected velocity for the second image, and comprises calculation means configured to calculate said expected velocity for the second image by taking into account a current estimated rotation matrix, a velocity of step and the frame rate of the apparatus.

According to another aspect of the disclosure a platform, for example a smartphone or a tablet, is proposed comprising an apparatus and a device as defined above.

BRIEF DESCRIPTION OF THE SEVERAL VIEWS OF THE DRAWINGS

Other advantages and features of the disclosure will appear in the detailed description below and in the appended drawings which are no limitative, in which.

DETAILED DESCRIPTION

For motion estimation of an apparatus, such as a camera, a problem that arises is to adopt proper motion model representation. This will impact heavily some algorithmic and implementation choices and limitations.

A pinhole projective model is the classical model used for embedded video applications.

In two dimensions, the problematic revolves around restrictions to the planar motion, going from a pure translation to perspective models, and even some more specific ones.

In 3D the main concern is the type of rotation representations that can lead to singularities, difficulties in interpretation, and filtering problems.

The pinhole camera model describes the mathematical relationship between a 3D object viewed by the camera and its 2D projection on the image.

It possesses many limitations: it does not take into account the focus of the camera which creates blur and it does not directly model the discretization that occurs when translating projected image into pixels. In addition, image distortions due to lenses are not considered.

However, this model is considered as a sufficient geometric approximation for many applications. The real final image plane presents a 180° rotation due to image rays crossing at the pinhole location.

Figure 1:
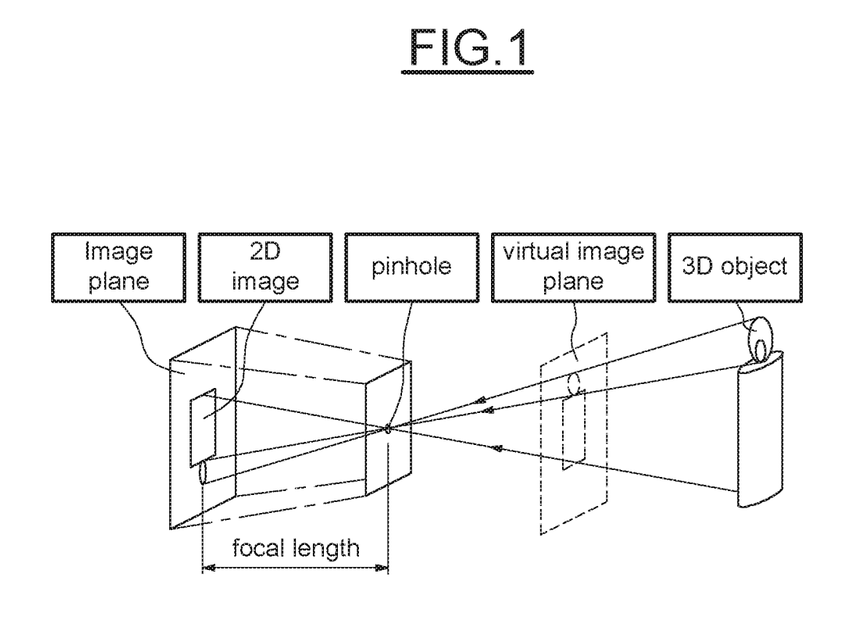
FIG. 1 illustrates a pinhole camera model

As one can see on FIG. 1, the real final image plane presents a 180° rotation due to image rays crossing at the pinhole location. To simplify computation, a virtual image plane is often considered in front of the pinhole. All equations presented in this disclosure will be based on this virtual image, which will now directly be referred to as the image to clarify and lighten the subject.

Figure 2:
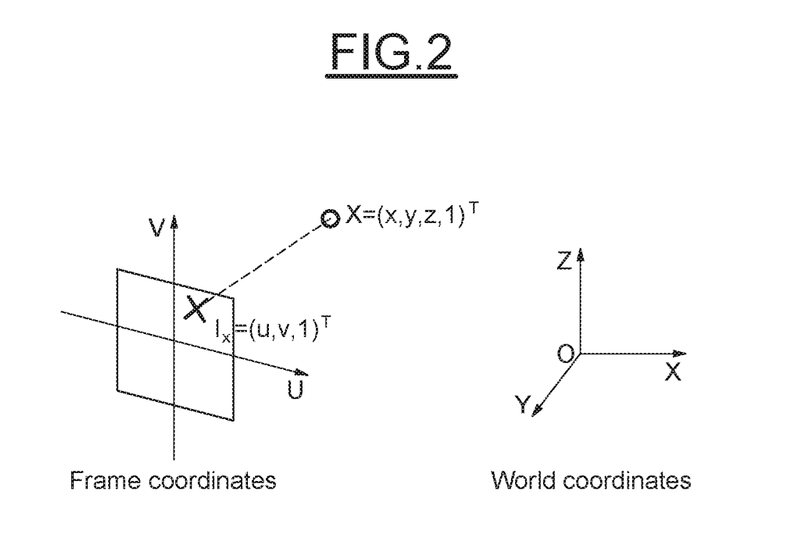
FIG. 2 illustrates coordinates notation.

We now consider a point X in 3D world homogenous coordinates: $X=(x, y, z, 1)^T$. The quantities x, y and z represent the world coordinates of the point. The image projection of the point X is noted $I_x$ with its 2D pixel coordinates $I_x=(u, v, 1)^T$, u and v being the horizontal and vertical pixel coordinates respectively. A scheme of this representation is displayed on FIG. 2.

The pinhole camera model describes the relationship between X and $I_x$.

This is made in two steps.

The first step explicitly models the geometric position and orientation of the camera with respect to world coordinates. This information is contained in a 3×4 projection matrix P=[R|t], where R is a 3×3 rotation matrix that encodes the orientation of the camera, and t a column vector of 3 elements, representing the position of the pinhole center of the camera.

The second step details the transformation of the projection into pixel points. This is modeled by a camera matrix K. In some studies, K is named the intrinsic matrix.

$$K = \begin{pmatrix} f & 0 & c_x \\ 0 & f & c_y \\ 0 & 0 & 1 \end{pmatrix}.$$

Where f is the focal length of the camera, and $(c_x, c_y)^T$ the principal point of the camera, that defines the projection of the camera principal rays into the image's plane.

Note that a square pixel is considered here, otherwise one could define two distinct focal lengths for the horizontal and vertical axis of the camera. The complete relationship between pixel location $I_x$ and 3D coordinates X is thus:
$I_x$=KPX While one may consider on-the-fly computation of both K and P matrices, the camera matrix can be computed once in a calibration process and then is considered fixed. The method disclosed in Zhang, Z., 2000,*A Flexible New Technique For Camera Calibration, IEEE Transactions on Pattern Analysis and Machine Intelligence,* 22(11), pp. 1330-1334, can be used for example in order to compute the intrinsic camera matrix K.

A 2D transformation between two frames can be expressed in many different manners. To keep the notation homogenous and simple, the transformation using the coordinates changes of a point is represented. A 2D homogenous point $I_x=(u, v, 1)^T$ in the first frame (for example the previous frame) is mapped to a point $I'_x=(u', v', 1)^T$ in the second frame (for example the current frame) by the transformation.

The first type of motion that can be modeled is a direct translation $T=(T_x, T_y)$. It is has a very simple effect on the coordinates:

$$I'_x = \begin{pmatrix} u' \\ v' \\ 1 \end{pmatrix} = \begin{pmatrix} u + T_x \\ v + T_y \\ 1 \end{pmatrix}.$$

The main characteristic of this motion model is that it only has 2 degrees of freedom. Therefore it is computable from only one point correspondence from a local motion estimation technique or a global one such as integral projections.

The limitation in terms of motion is very restrictive, and makes it only usable for very closely recorded frames, for example for video encoding, where every block's motion is estimated with a local translational motion model. This type of model can also be used in panorama and stabilization, if in-plane rotation is not considered.

Another type of 2D motion model is the rotation-preserving isometry, which correspond to an in-plane rotation by an angle θ combined with a translation:

$$I'_x = \begin{pmatrix} u' \\ v' \\ 1 \end{pmatrix} = \begin{pmatrix} \cos(\theta) & -\sin(\theta) & T_x \\ \sin(\theta) & \cos(\theta) & T_y \\ 0 & 0 & 1 \end{pmatrix} \begin{pmatrix} u \\ v \\ 1 \end{pmatrix}.$$

Only one degree of freedom is added to the translation model, but has a point correspondence provides two pieces of data, two point correspondences are needed to compute the isometry. This motion model is widely used for video stabilization, providing translational and rotational movement estimation that can be filtered. It is also sometimes used in tracking applications, when the size of the object on the image is not expected to change during the sequence.

For non-subsequent image motion estimation, scale changes need to be added to the motion model. This type of model is called a similarity transformation, with a scale change of Z:

$$I'_x = \begin{pmatrix} u' \\ v' \\ 1 \end{pmatrix} = \begin{pmatrix} Z\cos(\theta) & -Z\sin(\theta) & T_x \\ Z\sin(\theta) & Z\cos(\theta) & T_y \\ 0 & 0 & 1 \end{pmatrix} \begin{pmatrix} u \\ v \\ 1 \end{pmatrix}.$$

The augmentation of the model with scale opens up many application domains: long term tracking, recognition, etc. . . . .

Certain types of motions can lead to a deformation in the shape of the image. To include some simple transformations such as stretching or skewing it is needed to increase the number of parameters in the model:

$$I'_x = \begin{pmatrix} u' \\ v' \\ 1 \end{pmatrix} = \begin{pmatrix} a_{11} & a_{12} & T_x \\ a_{21} & a_{22} & T_y \\ 0 & 0 & 1 \end{pmatrix} \begin{pmatrix} u \\ v \\ 1 \end{pmatrix}.$$

This type of representation is an affine transformation. For instance this model is mapped to deduce specific deformations, created by motions recorded with a rolling shutter sensor. The extension to affine model was needed as these distortions do not preserve the shape of the image. As the degree of freedom is increased to 6, three points correspondences are needed to create this type of representation.

The last extension of this type of representation presented here is the projective transformation. The form of the transformation is the following:

$$I'_x = \begin{pmatrix} u' \\ v' \\ w' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} u \\ v \\ 1 \end{pmatrix}.$$

Note than the third coordinate is modified in the final image point $I'_x$, to retrieve the final location of the point on the image, one should divide the coordinates of the point by w'. This model is needed when modeling "out-of-plane" transformations, for instance 3D rotations. It is useful in applications requiring the tracking of a planar structure moving freely in a scene.

3D motion representation is a complex subject. Many types of model exist, but only the most applied in the context of general motion estimation purposes are discussed here.

Many representations for three dimensional rotations exist.

One of them comprises quaternions.

Quaternions possess a lot of mathematical history and backgrounds. They constitute a group based on the four dimensional vector set $R^4$ with specific operator for multiplication '∘'. The sub-group $S^3$ corresponds to quaternions of unit length, and is used to represent rotations. A quaternion $q=[q_x, q_y, q_z, q_w]^T$ encodes a rotation of angle θ around a unit 3D axis μ as:

$$[q_x, q_y, q_z, q_w]^T = \left[\mu\sin\left(\frac{\theta}{2}\right), \cos\left(\frac{\theta}{2}\right)\right]^T.$$

Formulas used to compute a rotation matrix R and its partial derivates based on quaternions members are well known by the man skilled in the art. As for rotation matrices, quaternions possess more members (4) than the degree of freedom of a 3D rotation (3). When performing filtering or optimization on quaternions representing rotations, one must ensure that their length is kept unit. This is very simply done by dividing each member of the quaternion by the total norm of it, which is much simpler than the orthonormalization used by rotation matrices.

Quaternions have numerous advantages over Euler angles (see below) and direct rotation matrices when it comes to representing rotations, they offer a good balance between numerical properties and do not present artifacts. They are widely used for inertial sensor fusion.

A rotation can be represented as a 3×3 matrix R. Every column of it are of unit length and mutually orthogonal, and the determinant of the matrix is +1. This type of matrices constitutes the SO(3) (for special orthogonal) group. Each matrix belonging to this group is a 3D rotation, and any composition of matrices from this group is a rotation. This representation of a rotation is the most direct one to apply, as a 3D point $X=(x, y, z, 1)^T$ is transformed by R to a point $X_{rot}=(x_{rot}, y_{rot}, z_{rot}, 1)^T$ by a simple 4×4 matrix multiplication based on the rotation R:

$$X_{rot} = \begin{pmatrix} R & 0 \\ 0 & 1 \end{pmatrix} X.$$

It must be noted that most of the other rotations representations are converted to a rotation matrix to be applied. The main drawback of the rotation matrix is the complexity of the constraints to keep the matrix in the SO(3) group when applying optimization of filtering techniques. In effect, those techniques will modify the coefficients of the matrix, but it should always be orthonormalized to belong to the SO(3) group. This is done at heavy cost and needs to be performed at each step of the algorithm where the matrix is modified.

Euler angles are the most used representation for 3D rotations. It includes separating the rotations to a minimal 3 angle values that represent the respective rotations around the axis of the coordinates in a sequential way. They are referred to as the yaw, the pitch and the roll angles. These three values are either expressed in degrees or radians. In order to apply the transformation to a point, the Euler angles are transformed into separate rotation matrices, which are combined to form the total rotation matrix that is then applied to the point. In this disclosure, it is referred to the yaw as α, the pitch as β, and the roll as γ. A big issue in using Euler angles is the necessity to establish a convention on the order of application of the angles. In effect, one can select which angle represents a rotation around an axis, as well as the order chosen to apply them. This can create confusion and misunderstandings.

Figure 3:
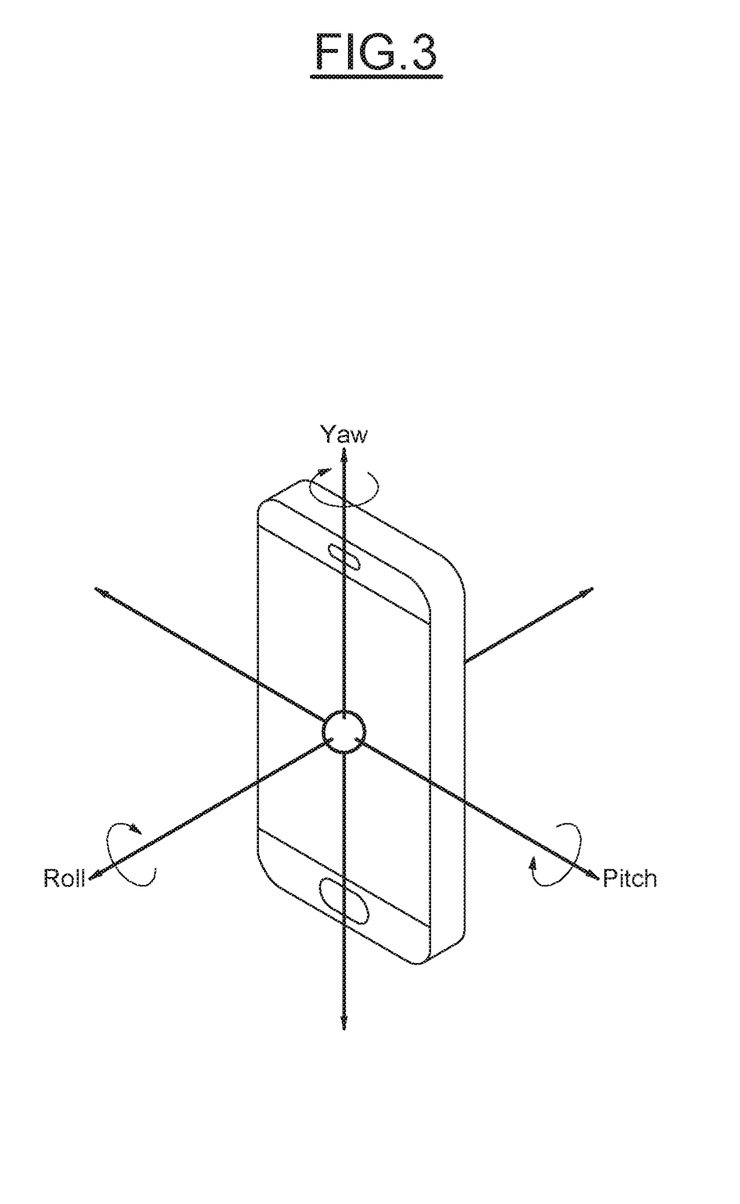
FIG. 3 illustrates a smartphone with an example of Euler angles,
FIGS. 4 to 5 detail an embodiment of a method according to the disclosure, and
FIG. 6 illustrate schematically an embodiment of a device and of a platform according to the disclosure.

In FIG. 3, an example of the axis displayed on a smartphone scheme is represented.

A 3D motion is a combination of a rotation and a translation $\tau=[\tau_x, \tau_y, \tau_z]^T$. As seen previously, one must always convert a rotation to a rotation matrix in order to apply it to a point. The complete motion regrouping a rotation R and a translation τ is applied to a point X by:

$$X' = \begin{pmatrix} R & \tau \\ 0 & 1 \end{pmatrix} X.$$

Estimating the frame to frame camera motion in a video sequence is a highly studied problem. It is a key step in many applications: camera stabilization, rolling shutter distortions correction, encoding, tracking, image alignment for High Dynamic Range, denoising . . . .

The first step of this type of technique is generally to extract motion vectors between pairs of images. This is performed by putting in correspondences points from one frame to another.

Many factors can impact the performance of these methods. In a sequence, illumination changes can occur, modifying the pixels values from one frame to another. In-plane rotations create another dimension in the problem, which can no longer be solved as a 2D translation estimation. Motion artifacts, such as motion blur or rolling shutter distortions also intervene in the process, creating variation in terms of pixel values and localizations. Finally, scene characteristics can make a great impact on the results of those techniques: a lack of texture in the scene, low-light heavy noise, etc.

A first category of algorithm makes use of pixel-wise computation. For a set of fixed given points in the first frame, a correspondence is searched in the second frame. This can be performed either for every point, which is generally called optical flow, or in a sparse manner, with techniques such as block matching or tracking.

For block-based/tracking methods, the first stage is selection of points on the first frame (with a grid pattern for instance) or every points for dense methods. Then the technique includes finding the corresponding locations of the selected points in the second frame.

The main drawback of block-based/tracking methods for pixel motion estimation, is that every pixel does not carry the same amount of useful information. For instance, estimating the motion of a white point on a white wall is much more challenging than a black point on the same wall. If a motion is to be estimated from two images that present changes in terms of conditions and location, it is preferable to have robustness to various transformations such as illumination changes, rotation, scale . . . .

Approaches of feature extraction have been designed with the goal of finding locations in the images that carry the most information and distinctiveness. Many types of features exist, including points, blobs, edges . . . . Points and blobs are however present in most types of sequences which makes them suitable for embedded applications. These points of interest are called keypoints.

The second category of vector generation techniques consists in extracting points of interest (keypoints) in every frame, rather than using fixed points (or every point) in the frame. Descriptors of each set of points are then computed, which consist in a higher-level, more robust information on the surrounding of the keypoint.

Correspondences are then drawn between these two set of points, in an operation known as matching.

Many feature detection methods exist.

One of these methods is based on an auto-correlation function a of a point $p=[u,v]^T$ and a shift $[\Delta u, \Delta v]^T$:

$$a(p,\Delta u,\Delta v)=\Sigma_{i=-N}^{i=N}\Sigma_{j=-N}^{j=N}(I(u+i,v+j)-I(u+\Delta u+i,v+\Delta v+j))^2.$$

If this auto-correlation is small in every direction, this translates a uniform region with little interest. Only a strong value in one direction most likely indicates a contour. If every direction displays strong values however, the point is considered as being a keypoint. With a first-order Taylor approximation, the auto-correlation matrix can be expressed in function of spatial derivate of the image. The keypoint evaluation is then made with regard to the eigenvalues $\lambda_1, \lambda_2$ of that matrix. The corner-ness function is:

$$f(p)=\det(a(p))-k(\text{trace}(a(p)))^2=\lambda_1\lambda_2-k(\lambda_1+\lambda_2)^2.$$

If this value at pixel p is higher than a threshold and higher than cornerness function f evaluated on neighborhood points, the point is considered a corner. The threshold can be set in function of the total desired number $N_{corners}$ of corners, or an absolute quality desired. The fact that the detectors consider all directions of a gradient matrix induces its robustness to illumination changes as well as in-plane rotations.

Other methods have been designed based on the gradient matrix to detect corners.

A very light extractor in terms of computational time known by the man skilled in the art under the acronym FAST (Features from Accelerated Segment Test) has been disclosed in:

Rosten, E. & Drummond, T., 2006. *Machine Learning For High-Speed Corner Detection, Lecture Notes in Computer Science (including subseries Lecture Notes in Artificial Intelligence and Lecture Notes in Bioinformatics)*, 3951 LNCS, pp. 430-443, and Rosten, E., Porter, R. & Drummond, T., 2010. *Faster and better: A Machine Learning Approach To Corner Detection, Pattern Analysis and Machine Intelligence*, IEEE Transactions on, pp. 1-35.

FAST is an algorithm to extract keypoints designed to be the lightest possible strategy, sparing computational resources for other tasks. It is a corner detector based on the Bresenham circle of radius 3 around a point p, which is simply the "pixelized" version of a circle. This circle contains 16 points, if a certain amount $N_{radius}$ of contiguous points' intensities are all either lower or brighter than the point p (plus/minus a threshold τ), the point p is considered a corner.

It has been shown that using the $N_{radius}=9$ (9 contiguous points are used to detect a corner) was a very good choice compared to other values, such as $N_{radius}=12$.

The global movement between two successive video images may be estimated via a RANSAC algorithm.

The RANSAC algorithm is an iterative procedure that finds, among a set of proposed models, the one with the largest consensus, meaning the model that accounts for pieces of data with an error inferior to a threshold T.

This model is computed with a confidence η, a parameter that can be set by the user.

The key of the method is to explicitly integrate the proportion of good pieces of data, or the inlier percentage ε, in order to determine the number of iterations needed to reach a confidence level of η that the best model found is indeed the correct one. As it is applied in the context to motion estimation, the following notation may be used:

the input data is a set of N motion vectors $v(i)=(X_i^{prev}, X_i^{curr})$, where $X_i^{prev}$ is the point on the previous frame and $X_i^{curr}$ the point on the current frame and h is a 2D motion model in the form of a 3×3 matrix as shown above.

The first stage of the procedure is to compute a model $h_0$ with a minimal amount m of randomly selected motion vectors v(i) for the desired model type. For instance, a similarity transformation that incorporates in-plane rotation, scaling and translation uses 3 motion vectors.

In a second step, the created motion model is tested with all pieces of data available. For each motion vectors the reprojection error is computed applying the proposed model to the previous points:

$$\epsilon(h_0, v(i)) = \|h_0 X_i^{prev} - X_i^{curr}\|.$$

If $\epsilon(h_0, v(i))$ is below the threshold T, the vector v(i) is considered an inlier with respect to model $h_0$, otherwise it is an outlier for this model.

Thirdly, the total number of inliers $k_0$ leads to the inlier percentage for this model: $\epsilon_0 = k_0/N$.

This allows to calculate the remaining number of iterations. In effect, with this estimated percentage of inlier, the probability to create a model with inliers only is $\epsilon_0^m$. If the procedure is iterated K times, the probability that not a single model was created with inliers only is: $(1-\epsilon_0^m)^K$. As the desired confidence is r, the probability $(1-\epsilon_0^m)^K$ needs to be equal to $(1-\eta)$:

$$(1-\epsilon_0^m)K = (1-\eta).$$

As we look for the number of iterations that should be produced:

$$K \geq \frac{\log(1-\eta)}{\log(1-\epsilon_0^m)}.$$

Fourthly, steps a) and b) are repeated K times, or until a better model $h_j$ is found, in the sense that it displays a higher inlier percentage. If this occurs, then K is recomputed with the new inlier percentage, which leads to a lower amount of remaining iterations.

Finally, when the number K of iterations has been reached, the best model is considered to be the one with the highest support, which corresponds to the highest inlier percentage. In most implementations, K is bounded so that the procedure does not produce too much computations. In some implementations, the best model $h_{best}$ is recomputed with a least-square approach with all its inliers.

This procedure is "memory-less" in the sense that, for each iteration, the new model under testing is not dependent with the previous ones, only the amount of iterations relies on what was computed before. Other techniques, such as Least-Median-of-Square (LMedS) proceed similarly, but differ in considering the median error of a model hi as the criteria of performance of a model, rather than its inlier percentage $\epsilon_j$.

The main advantage of the RANSAC strategy is that it can extract a motion model without restriction on the amount/type of noise. It does not require massive parameterization, as only T and η have to be set. Thanks to the lack of dependency between two iterations, it is very prone to parallel implementation. However, this procedure cost can vary a lot, as it relies on the quality and quantity of the dataset.

However the RANSAC technique has a very variable computational time that scales linearly with the amount of data and also relies heavily on the dataset quality, by the rate of inliers. To avoid those drawbacks, the RANSAC technique was adapted in a preemptive procedure. An overview of the preemptive RANSAC algorithm is the following one:

1) Generate M motion models $h_j$, by selecting randomly a minimal number of vectors v(i) to create each model, initialize a score $S_j=0$ for each model, set the increment step i=1;

2) For every model $h_j$, compute the reprojection error $\epsilon(h(j), v(i))$ on the set of vectors—if it is below the predefined threshold T for the model $h_j$, then update its score: $S_j = S_j + 1$;

3) Only keep the best f(i) models (sorting by score), where f( ) is a preemption function; and 4) If $f(i) \leq 1$ (only one model left) or i=N (we have tested every motion vectors), keep the model with the highest score as the global estimation, otherwise, set i=i+1 and go to step 2.

The preemption function f(i) defines the number of models kept at each stage of the algorithm. For instance, the one used is:

$$f(i) = \lfloor M 2^{-\lfloor i/B \rfloor} \rfloor$$

where B is a bundle size of motion vectors, and $\lfloor . \rfloor$ denotes the downward truncation function.

In this example, the number of models considered after each bundle of B motion vectors is just divided by two.

However, although the Preemptive RANSAC algorithm has certain advantages notably in terms of calculation time, which makes it particularly well suited for embedded applications, and also for parallel processing, movement estimation is less flexible and sometimes not really suitable for extreme cases. Thus, for example, if a person or an object moves in an image field, it may happen that the movement estimator is focused on the person, producing a result that does not match the movement of the camera, which could, for example, provide incorrect video stabilization.

An improvement has been disclosed in U.S. Patent Publication No. 2016/0105590, which is incorporated by reference herein in its entirety, enabling the quality of the image sequence to be improved, and in particular, in certain specific situations. Such an improvement is called Hybrid Ransac and uses information originating from at least one inertial sensor, e.g., at least one gyroscope, in combination with the visual information for improving the estimation of the movement between two successive images.

The hybrid preemptive RANSAC algorithm with all the steps involved, can be summarized as follows:

1) Generate M−1 Motion models $h_j$, by selecting randomly a minimal number of vectors to create each model, create the last model using only inertial measurements;

2) Compute the distance between the visual and inertial models $\partial(h_j, I(t))$ for each model;

3) Using the median value $\partial_{med}$, compute $\lambda_{dyn}$;

4) Initialize the hybrid score for each model $S_{hyb}(j) = N\lambda_{dyn}(1-e^{-\partial(h_j, I(t))})$, set the increment step i=1;

5) Compute the reprojection error $\epsilon(h_j, v(i))$ for every model h(j)—if it is below T, then update the score of the model $h_j$ as: $S_j^{hyb} = S_j^{hyb} + 1$;

6) Only keep the best f(i) models (sorting by score), where f( ) is a preemption function; and 7) If f(i)≤1 or i=N, keep the model with the highest score as the global estimation—otherwise, set i=i+1 and go to step 5.

Adaptation of the hybrid RANSAC algorithm to estimate 3D rotation is now described.

The inertial data are modeled as Euler angles Inert(t)=$\alpha_t$, $\beta_t$, $\gamma_t$ as the relative yaw, pitch and roll differences that occurred between frame t−1 and frame t. The visual measurement are the 3D/2D correspondences between the 3D map modeled in the SLAM and the current 2D frame with its extracted features. The motion models h(j) could be taken as rotation matrices, but it would lead to a high complexity both in model generation and in error computation $\epsilon$(h(j), v(i)), since one would project exactly every point and then compute its reprojection error.

To avoid these costs, it is advantageous to model the rotation representations as Euler angles h(j)=($\omega_x$, $\omega_y$, $\omega_z$). This will lead to approximations that are acceptable when dealing with small angles. Measurements are first taken as couples ($X_k$, $p_i$), with $X_k=(x_k, y_k, z_k, w_k)^T$ a 3D point in homogenous coordinates, and $p_i=(u_i, v_i, w_i)$ a 2D point of the current frame. Those measurements are converted to motion vectors, to make the motion model generation less expensive.

K is the 3×3 intrinsic parameters matrix of the camera. P is the estimated 3×4 projection matrix from the previous frame. For each measurement, the 3D point is projected into the previously estimated camera pose according to:

$$p_k^{proj} = K * P * X_k.$$

Measurements v(i) are now couples ($p_k^{proj}$, $p_i$). $du_i$ is the horizontal component of the motion vector:

$$du_i = \frac{u_k^{proj}}{w_k^{proj}} - \frac{u_i}{w_i}.$$

With similar computations, $dv_i$ is calculated as the vertical component of the motion vector. We now need to generate the motion models h(j), with a minimal number of visual measurements v(i). While an exact computation of the rotation would require fairly complex methods, an approximation of it can be performed rapidly with two measurements v(i) and v(i'), as one is not enough to compute the three rotations. The average motion is interpreted as the rotation in both directions. We compute yaw (with a similar technique for pitch $\omega_y$) as:

$$\omega_x = (du_i + du_{i'})/2\rho_x.$$

Where $\rho_x$, $\rho_y$ are the respective scaling factors to convert yaw into horizontal translation and pitch into vertical translation in the 2D frame. Computation are solely based on focal length of the camera and resolution of the image. Roll is calculated with a difference of angles in polar coordinates:

$$\omega_z = a\tan 2(dv_{i'}, du_{i'}) - a\tan 2(dv_i, du_i).$$

In a preemptive RANSAC procedure, considering an inlier rate $\tau_{inlier}$, the probability to generate a model without outlier is $(\tau_{inlier})^m$, m being the number of measurement used to create a model. In the present approach, m=2, inducing a high probability to generate an outlier-free model. This is highly beneficial compared to other rotational models that need a much higher m. $\delta$(h(j), Inert(t)) is simply the L2-norm between the two Euler angle representations. The error function $\epsilon$(h(j), v(i)) is chosen as the reprojection error.

Inertial sensors offer a good complementary estimation to vision when it comes to rotational motion. For camera position estimation however, they do not provide reliable information. On the other hand, visual based motion estimation also has difficulties regarding repetitive or low textured contents, typically found for example in large rooms. Therefore there is a need for a flexible position estimation, which could cope with very low quality measurements without drifting too much, and re-converge when meaningful information is provided back.

Thus according to an embodiment of the disclosure, a particle swarm filter is applied for the 3D position and velocity of the camera.

Figure 4:
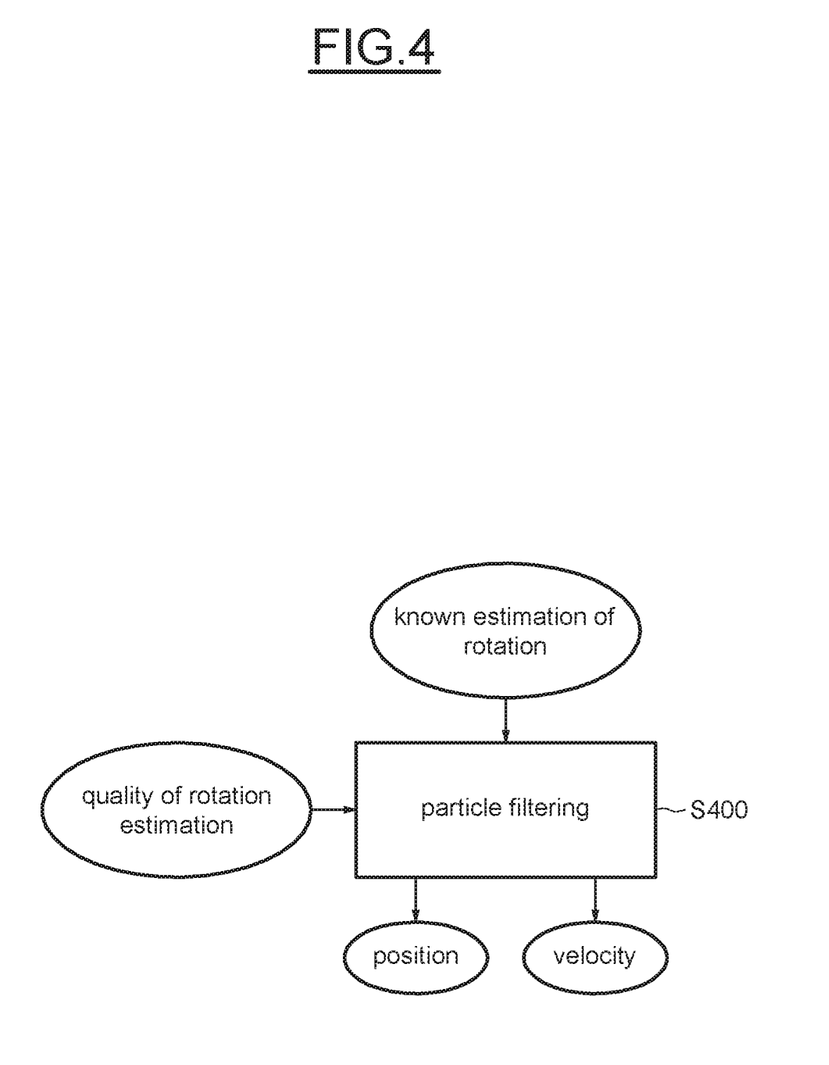
Figure 5:
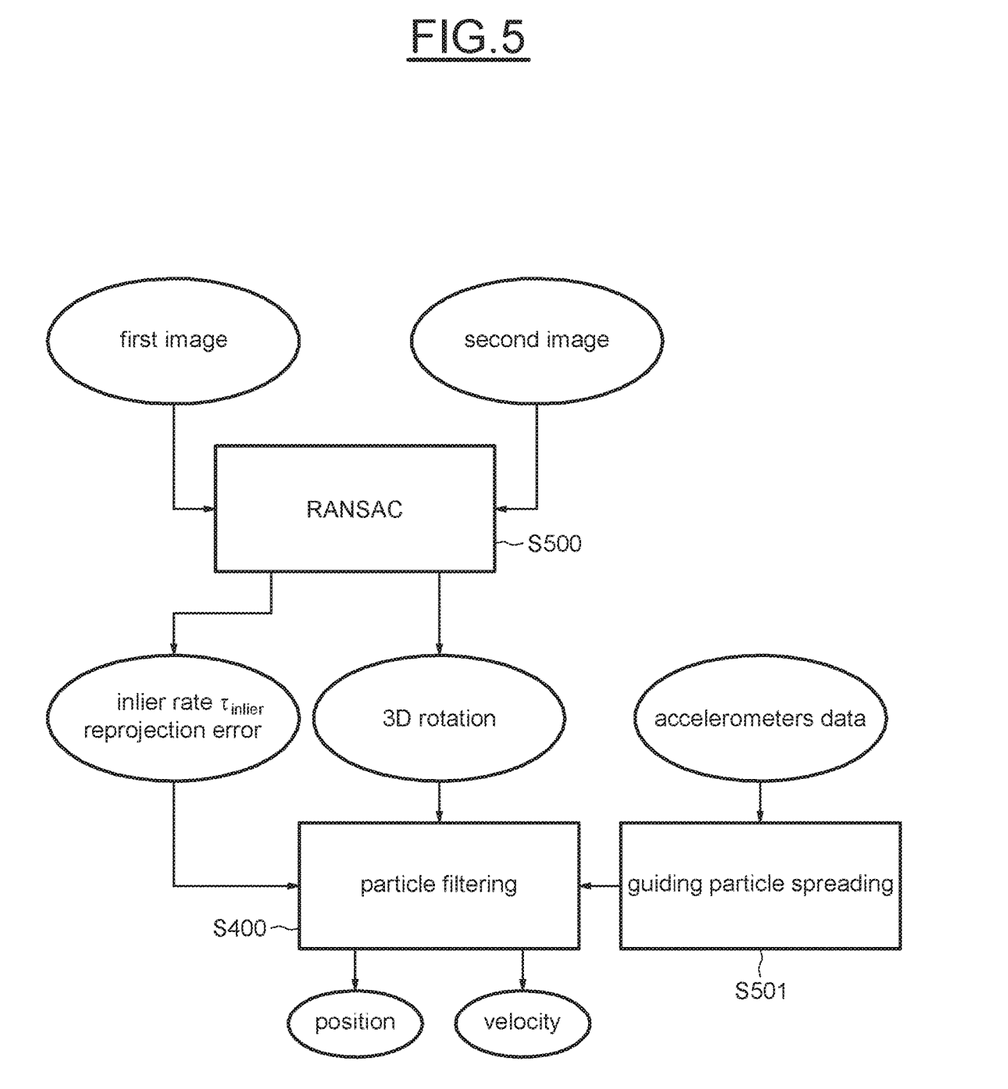

More particularly, an embodiment of a method of estimating a position variation of a motion of an apparatus, such as camera, between a first instant and a second instant is now disclosed with reference in particular to FIGS. 4 and 5.

Said apparatus is intended to capture a sequence of images, a first image being captured at said first instant, a second image being captured at said second instant.

Said motion includes a rotation of the apparatus and said position variation.

Said position variation includes a position and a velocity.

According to a non-limitative example, said motion maybe an ego-motion of the apparatus between the first image and the second image including a 3D rotation of the apparatus and a position variation of the apparatus in the 3D space.

As illustrated on FIG. 4, estimating said position variation comprises performing a particles filtering S400 for estimating said position and velocity from the probabilistic-weighted average of the particles.

Each particle is for example a virtual apparatus, such as a virtual camera.

Said particle filter uses a known estimation of said rotation and, as it will be explained more in details thereafter, is parameterized for taking into account a quality of said rotation estimation.

As illustrated on FIG. 5, the known estimation of the rotation, for example the 3D rotation, may be obtained by performing (step S500) a RANSAC type algorithm, for example but non-limitatively an hybrid RANSAC algorithm, providing an inliers rate $\tau_{inlier}$.

Particle filtering is widely used in many domains of computer vision, from tracking to odometry. Also known as sequential Monte-Carlo estimation, it is a density estimator that utilizes a sampling strategy to represent the posterior density of the state probability [see for example Lui, J. S. & Chen, R., 1998. Sequential Monte Carlo Methods for Dynamic Systems. *Journal of the American Statistical Association*, 93(443), pp. 1032-1044, which is incorporated by reference in its entirety in the present patent application].

The approach proposed here is based on the particle swarm technique.

Based on the 3D/2D visual measurements v(i), now supposedly outlier free with the hybrid RANSAC procedure, an estimation of the camera position and velocity is performed. The estimated 3D position at frame t is noted $\hat{D}_t$, the estimated velocity is noted $\hat{V}_t$.

Each particle (which is a virtual camera) $\xi_i^t$ has its own position $d_i^t$ and velocity $v_i^t$.

The algorithm comprises two steps.

Firstly, the position $d_i^t$ is computed according to the following equation:

$$d_i^t = d_i^{t-1} + v_i^{t-1}.$$

Secondly, the probability of each particle with respect to the measurements $\pi(\xi_i|v(1, \ldots, N))$ is computed. In order to estimate these probabilities, the previously calculated rotation $h(j_{best})$ (motion model) is used.

The Euler angles are converted to an axis $k_{best}$ and angle $\theta_{best}$ representation.

Then the Rodrigues formula is used in order to obtain the corresponding rotation matrix:

$$R_{best} = I + K_{best} \sin \theta_{best} + K_{best}^2 (1 - \cos \theta_{best})$$

with $K_{best}$ being the cross-product matrix of the vector $k_{best}$.

A projection matrix $P_l$ is therefore generated for every particle: $P_l = [R_{best}|d]$.

Inlier measurements points are projected into the frame for every particle, with projection matrices $P_l$.

The reprojection error of measurement $v(i)$ for particle $\xi_i^t$ is noted $\varepsilon_i^l$.

$\pi(\xi_i^t(1, \ldots, N))$ is computed as:

$$\pi(\xi_i^t|v(1 \ldots, N)) = 1/\Sigma_i \varepsilon_i^l.$$

The estimated position and velocity are calculated as the probabilistic-weighted average of the particles.

$$\hat{D}_t = \sum_l \frac{\pi(\xi_l^t | v(1, \ldots, N))}{\pi_{tot}} d_l^t$$

with $\pi_{tot} = \Sigma_l \pi(\xi_l^t|v(1, \ldots, N))$.

The particle with highest probability, $\xi_{best}^t$, is now used to compute the velocity of each particle.

As mentioned above, the particle filter is parameterized for taking into account a quality of the rotation estimation and said parameterization is used in the velocity estimation.

More precisely a first parameter $\kappa$ is used in the velocity calculus to adapt dynamically the filter to the quality of tracking:

$$v_l^t = v_l^{t-1} + \kappa(d_{best} - d_l^t) + (1-\kappa)r(l)$$

where $r(l)$ is a random 3D vector, which is generated according to a Gaussian distribution $\mathcal{N}(\mu_r, \sigma_r)$. The choices of $(\mu_r, \sigma_r)$ will be explicated below.

$\kappa$ dictates how heavily it is desired to emphasize the convergence to the best particle found in the current step.

To make the filter reactive to the tracking quality, $\kappa$ is set according to a relationship between the inlier rate found in the Hybrid RANSAC $\tau_{inlier}$, the reprojection error of the best particle $\varepsilon^{best}$, and a typical targeted reprojection error $\varepsilon^{typ}$:

$$\kappa = \tau_{inlier} e^{-\left(\frac{\varepsilon^{best}}{\varepsilon^{typ}}\right)^2}.$$

Thanks to this specific parameterization, the particle filter reacts to the quality of the estimation, heavily diffusing the particles in case of very poor tracking, while providing a high convergence to the best particle in case of high quality tracking estimated.

As illustrated on FIG. 5, estimating the velocity may further comprise guiding the particle spreading (step S501) with a pedestrian step detection technique using accelerometers data.

As a matter of fact inertial sensors, such as accelerometers, permit to perform step counting. Thus it is possible to know if the platform (for example the smartphone) is held by a walking person.

In such a case the particle diffusion is directed following the walking direction.

More precisely, according to an embodiment, the two parameters that can be tuned are $(\mu_r, \sigma_r)$ which are the characteristics of the Gaussian distribution for particle velocity calculation.

$\mu_r$ is a vector representing a typical velocity expected for the second image. If the person is detected as walking, $\mu_r$ is calculated as:

$$\mu_r = R_{current} * \begin{pmatrix} 0 \\ 0 \\ S_t / fps \end{pmatrix}$$

with $R_{current}$ being the current estimated rotation matrix, St the typical velocity of step and fps the frame rate of the camera. This parameterization will orientate the particle spreading forward, and help the algorithm to cope with walking motion, without explicitly including a motion model in the approach.

$\sigma_r$ may be constant or tuned.

Figure 6:
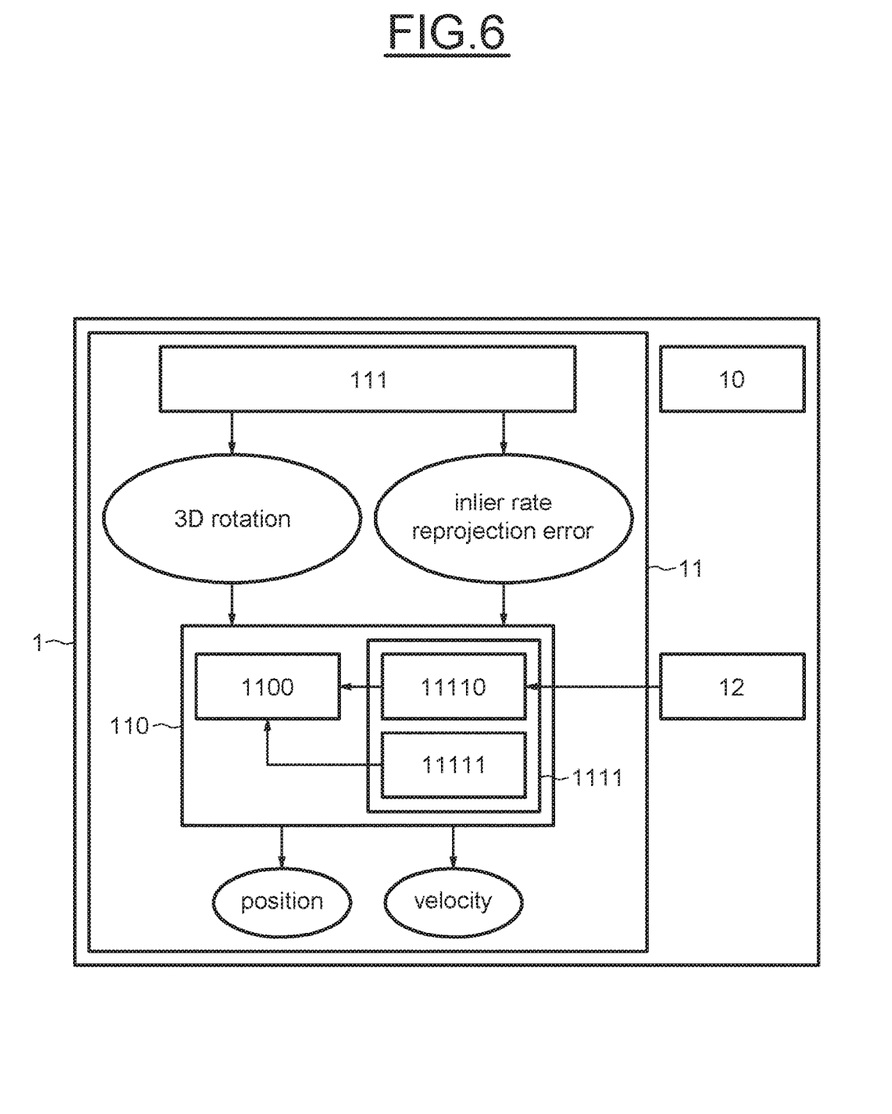

We refer now more particularly to FIG. 6, which illustrates diagrammatically an embodiment of a platform 1, for example a smartphone or a tablet according to the disclosure including a device 11 according to the disclosure, an apparatus 10, like an image sensor 10, as for example a camera, and accelerometers 12.

The device 11 comprises one or more processors 110 configured to estimate a position variation of a motion of the apparatus 10 between a first instant and a second instant.

Said one or more processors 110 comprises particles filter means 1100 configured to perform a particles filtering for estimating said position and velocity from the probabilistic-weighted average of the particles.

The device 11 further comprises a first processing module configured to estimate said 3D rotation by performing a RANSAC type algorithm providing the inliers rate.

Optionally the one or more processors 110 comprises a second processing module 1111 configured to estimate said velocity and comprising a guiding module 11110 configured to guide the particle spreading with a pedestrian step detection technique using accelerometers data.

The second processing module 1111 is advantageously configured to take into account the first parameter $\kappa$ and the random 3D vector $\mu_r$ and comprises calculation means 11111 configured to calculate the expected velocity for the second image.

All these means and modules may be realized for example by a microprocessor executing software.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   estimating a rotation of an apparatus; and
   estimating a position variation of a motion of the apparatus between a first instant and a second instant, said motion including the rotation of the apparatus and said position variation, said position variation including a position and a velocity, wherein estimating said position variation comprises performing particle filtering to estimate said position variation from a probabilistic-weighted average of particles, said particle filtering having as inputs the estimated rotation and a parameter indicative of a quality of the estimated rotation, the parameter being based on an inliers rate of the estimated rotation.

2. The method according to claim 1, wherein said parameter is used in estimating the velocity of the position variation.

3. The method according to claim 2, wherein estimating said velocity comprises guiding particle spreading with a pedestrian step detection technique using accelerometer data.

4. The method according to claim 3, wherein the velocity estimation takes into account said parameter and a random 3D vector generated according to a Gaussian distribution involving an expected velocity for the second image, and said expected velocity for the second image is calculated by taking into account a current estimated rotation matrix, a velocity of step and a frame rate of the apparatus.

5. The method according to claim 1, wherein said apparatus is intended to capture a sequence of images, a first image being captured at said first instant, a second image being captured at said second instant, said motion is an ego-motion of the apparatus between the first image and the second image including a 3D rotation of the apparatus and a position variation of the apparatus in the 3D space, and each particle is a virtual apparatus.

6. The method according to claim 5, wherein said 3D rotation is estimated by performing a RANSAC type algorithm providing the inliers rate.

7. The method according to claim 6, wherein said parameter is a relationship between said inliers rate, a reprojection error of a best particle, and a targeted reprojection error.

8. The method of claim 1, comprising:
   generating a mapping of an environment of the apparatus based on the estimated position variation.

9. A device, comprising:
   means for estimating a rotation of an apparatus; and
   means for estimating a position variation of a motion of the apparatus between a first instant and a second instant, said motion including the rotation of the apparatus and said position variation, said position variation including a position and a velocity, wherein said means for estimating the position variation includes means for particle filtering of particles for estimating said position and velocity from a probabilistic-weighted average of the particles, said particle filtering having as inputs the estimated rotation and a parameter indicative of a quality of said rotation estimation, the parameter being based on an inliers rate of the estimated rotation.

10. The device according to claim 9, wherein said parameter is used to estimate the velocity of the position variation.

11. The device according to claim 10, wherein said estimating said velocity includes guiding the particle spreading with a pedestrian step detection technique using accelerometer data.

12. The device according to claim 11, wherein said estimating the velocity takes into account said parameter and a random 3D vector generated according to a Gaussian distribution involving an expected velocity for the second image, and said expected velocity for the second image takes into account a current estimated rotation matrix, a velocity of step and a frame rate of the apparatus.

13. The device according to claim 9, wherein said apparatus is configured to capture a sequence of images, including a first image captured at said first instant, and a second image captured at said second instant, said motion is an ego-motion of the apparatus between the first image and the second image including a 3D rotation of the apparatus and a position variation of the apparatus in the 3D space, and each particle is a virtual apparatus.

14. The device according to claim 13, wherein the means for estimating rotation estimates said 3D rotation by performing a RANSAC type algorithm providing the inliers rate.

15. The device according to claim 14, wherein said parameter is a relationship between said inliers rate, a reprojection error of a best particle, and targeted reprojection error.

16. The device of claim 9, comprising:
   means for generating a mapping of an environment of the apparatus based on the estimated position variation.

17. A platform, comprising
   an apparatus; and
   a device including means for estimating a rotation of the apparatus and means for estimating a position variation of a motion of the apparatus between a first instant and a second instant, said motion including the rotation of the apparatus and said position variation, said position variation including a position and a velocity, wherein said means for estimating the position variation includes a particle filter for particle filtering of particles for estimating said position and velocity from a probabilistic-weighted average of the particles, said particle filtering having as inputs the estimated rotation and a parameter indicative of a quality of said rotation estimation, the parameter being based on an inliers rate of the estimated rotation.

18. The platform according to claim 17, wherein said apparatus is configured to capture a sequence of images, including a first image captured at said first instant, and a second image captured at said second instant, said motion is an ego-motion of the apparatus between the first image and the second image including a 3D rotation of the apparatus and a position variation of the apparatus in the 3D space, and each particle is a virtual apparatus.

19. The platform according to claim 18, wherein the estimating the rotation of the apparatus includes estimating a rotation in said 3D space by performing a RANSAC type algorithm providing the inliers rate.

20. The platform according to claim 17, wherein said estimating said velocity comprising guiding the particle spreading with a pedestrian step detection technique using accelerometer data.

21. The platform according to claim 20 wherein the velocity estimation takes into account said parameter and a random 3D vector generated according to a Gaussian distribution involving an expected velocity for the second image, and said expected velocity for the second image takes into account a current estimated rotation matrix, a velocity of step and a frame rate of the apparatus.

22. The platform of claim 17, comprising:
means for generating a mapping of an environment of the apparatus based on the estimated position variation.

23. A system, comprising:
one or more sensors; and
processing circuitry coupled to the one or more sensors, and which, in operation:
estimates a rotation of an apparatus; and
estimates a position variation of a motion of the apparatus between a first instant and a second instant, the motion including the rotation of the apparatus and the position variation, the position variation including a position and a velocity, wherein said position variation is estimated using particle filtering to estimate said position variation from a probabilistic-weighted average of particles, said particle filtering having as inputs the estimated rotation and a parameter indicative of a quality of the estimated rotation, the parameter being based on an inliers rate of the estimated rotation.

24. The system of claim 23 wherein said parameter is used in estimating the velocity of the position variation.

25. The system of claim 23 wherein the one or more sensor comprise an image sensor which, in operation, captures a sequence of images, a first image being captured at said first instant, a second image being captured at said second instant, said motion is an ego-motion of the apparatus between the first image and the second image including a 3D rotation of the apparatus and a position variation of the apparatus in the 3D space, and each particle is a virtual apparatus.

26. The system of claim 25 wherein said 3D rotation is estimated by performing a RANSAC type algorithm providing the inliers rate.

27. The system of claim 25 wherein the one or more sensors comprise an accelerometer.

28. The system of claim 23 wherein the processing circuitry, in operation, generates a mapping of an environment of the apparatus based on the estimated position variation.

* * * * *